United States Patent [19]

McCracken

[11] 4,205,866

[45] Jun. 3, 1980

[54] SWIVEL JOINT

[75] Inventor: Donald G. McCracken, Horton, Mich.

[73] Assignee: Aeroquip Corporation, Jackson, Mich.

[21] Appl. No.: 940,984

[22] Filed: Sep. 11, 1978

[51] Int. Cl.[2] .............................................. F16L 27/00
[52] U.S. Cl. .................................... 285/281; 285/415; 285/94
[58] Field of Search ............... 285/184, 181, 276, 281, 285/275, 190, 277, 278, 279, 280, 415, 94

[56] References Cited

U.S. PATENT DOCUMENTS

| | | | |
|---|---|---|---|
| 944,877 | 12/1909 | Koschinski | 285/415 X |
| 2,281,019 | 4/1942 | Brauer | 285/281 X |
| 2,580,626 | 1/1952 | Warren | 285/281 X |
| 2,655,391 | 10/1953 | Atkins | 285/275 |
| 2,768,358 | 10/1956 | Moseley et al. | 285/276 X |
| 3,148,897 | 9/1964 | Hurt et al. | 285/181 X |
| 3,401,956 | 9/1968 | McCracken | 285/190 X |
| 3,408,095 | 10/1968 | Moore | 285/110 |
| 3,411,526 | 11/1968 | Schaefer | 285/190 X |
| 3,497,244 | 2/1970 | Grantom | 285/276 X |
| 3,913,952 | 10/1975 | Mutsui | 285/281 |

OTHER PUBLICATIONS

Bulletin No. SJ-512, "Continental-Emsco".

*Primary Examiner*—Dave W. Arola
*Attorney, Agent, or Firm*—Collins, Oberlin & Darr

[57] ABSTRACT

A fluid conducting swivel joint of inexpensive construction having a rotatable sleeve member surrounded by a casing member and including a pair of spaced-apart preloaded thrust bearings for permitting relative coaxial rotation between the sleeve and casing members. The thrust bearings are mounted in the spaced-apart relationship on the sleeve member by a split collar retained thereon by a cup-shaped retainer. Fluid and dust seals are provided between the members for preventing leakage of the fluid and the ingress of dust or other debris into the bearings, respectively. Also, the swivel joint may be provided with a pair of radial bearings so that it can withstand extreme side loads.

7 Claims, 4 Drawing Figures

SWIVEL JOINT

BACKGROUND OF THE INVENTION

1. Field of the Invention

This invention generally relates to swivel joints, and more particularly to fluid conducting swivel joints which permit relative coaxial rotation between two parts of a fluid conducting line having a common axis through the joint.

2. Description of the Prior Art

Generally, swivel joints are employed in environments wherein fluid communication must be maintained between swivelling or rotating members such as in hose reel installations. Normally, the swivel joint includes a sleeve member axially aligned with and affixed to the swivelling or rotating member.

Conventionally, the sleeve member is rotatably mounted within a casing member by ball bearings wherein races are machined in the sleeve and/or casing members as illustrated, for example, in U.S. Pat. No. 3,401,956, issued on Sept. 17, 1968 and U.S. Pat. No. 3,408,095 issued on Oct. 29, 1968. Such swivel joint designs require that the sleeve and casing members be made of a material which has good load characteristics and the races therein must be accurately machined to close tolerances. Of course, such a joint construction is extremely expensive.

SUMMARY OF THE INVENTION

Briefly, the present invention resides in a novel swivel joint structure having a pair of spaced-apart first and second needle thrust bearings employed between interfitting sleeve and casing members wherein a preload can be applied to the bearings for firmly supporting the sleeve within the casing and, thus, improving the integrity of the seals. More specifically, the sleeve member is provided with a removable split collar for spacing the thrust bearings apart. The split collar is encased within a cup-shaped retainer which secures the split collar on the sleeve member. Accordingly, the first thrust bearing is disposed between one face of the collar and a shoulder on the casing member, and the second thrust bearing is disposed between the other face of the collar and an end face of a nut which is threadedly attached to the casing member. Tightening of the nut preloads the bearings, thus firmly supporting the sleeve within the casing which, in turn, improves the integrity of the seals employed in the swivel joint. The nut is locked in a predetermined relationship to the casing member for preventing loss of the preload on the thrust bearings.

OBJECTS AND ADVANTAGES

An object of this invention is to provide a swivel joint of economical construction wherein a pair of low cost spaced-apart thrust bearings are interposed between interfitting sleeve and casing members.

Another object of this invention is to provide a novel swivel joint structure which employs a pair of low cost thrust bearings that are mounted in a spaced-apart relationship and preloaded for firmly supporting the sleeve member within the casing member.

Another object is to provide an economical swivel joint capable of withstanding relatively high bending moment forces imposed on the casing without causing binding of the casing upon the sleeve and wherein bearings insure rotation of the sleeve within the casing even when the swivel joint is subjected to extreme side loads.

A further object of this invention is to provide an improved swivel joint structure which is simple in construction, easily reconditioned and economical to manufacture.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENTS

Figure 1:
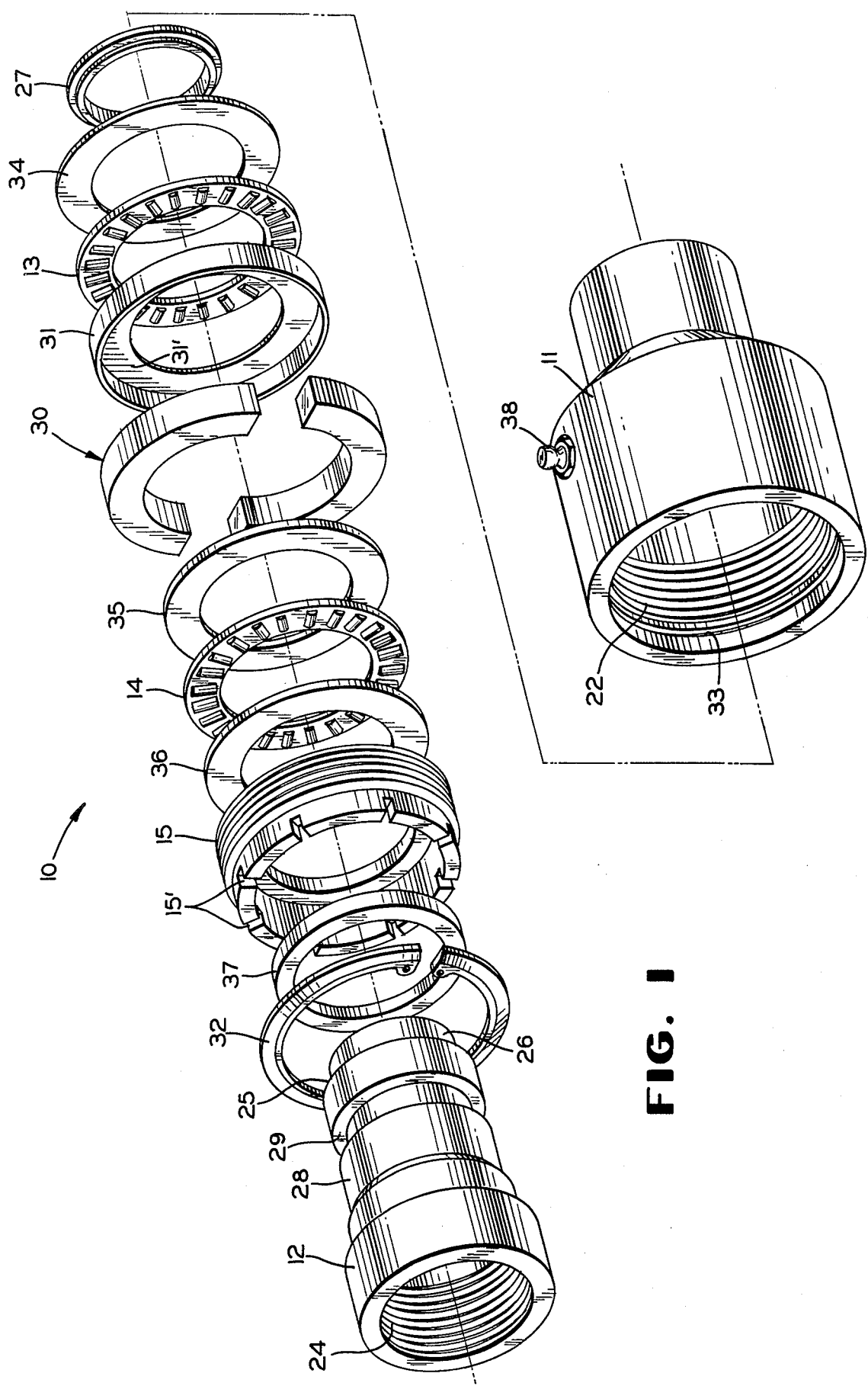
FIG. 1 is an exploded perspective view of a swivel joint constructed in accordance with the invention.

Referring now to the drawings, there is illustrated an improved swivel joint structure designated in its entirety by the reference numeral 10 which is constructed in accordance with the invention. Briefly, the swivel joint 10 generally comprises a casing member 11 and interfitting sleeve member 12 rotatably supported within the casing 11 by first and second spaced-apart thrust bearings 13 and 14, respectively, and a nut 15 for applying a preload on the bearings.

Figure 2:
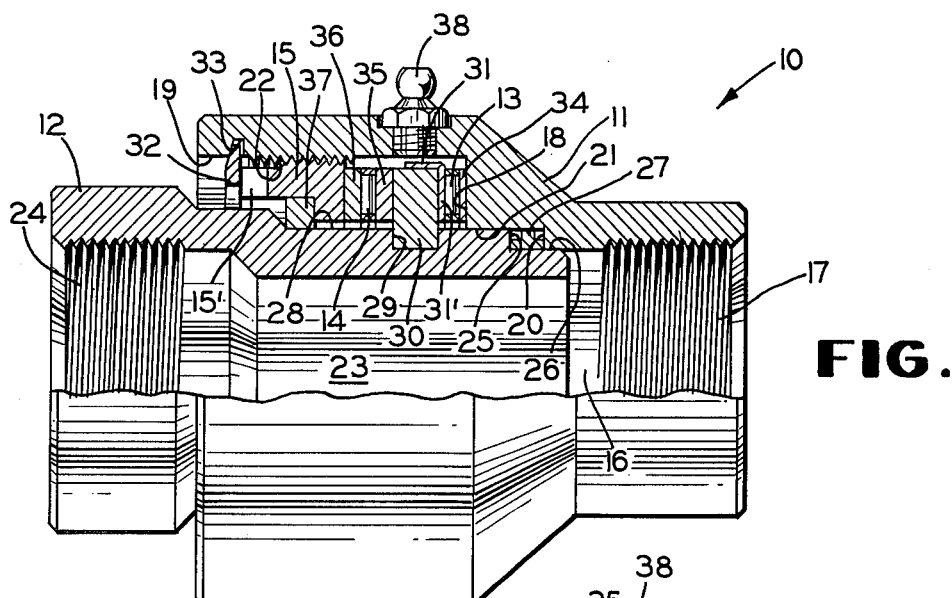
FIG. 2 is a longitudinal sectional view of a swivel joint illustrated in FIG. 1.

Referring more particularly to FIG. 2, the casing member 11 is cylindrical in form and has a passageway 16 extending concentrically therethrough. One end of the passageway 16 is internally threaded as at 17 for attaching the casing to a piping system (not shown). The passageway 16 includes a first shoulder 18 defining a first annular portion 19 for receiving and retaining the bearings 13 and 14 and a second shoulder 20 defining a second smaller annular portion 21 for receiving and interfitting with a section of the sleeve member 12. A section of the first annular portion 19 is internally threaded as at 22 for threadedly receiving the nut 15.

The sleeve member 12, also cylindrical in form, has a concentric longitudinal bore 23 extending therethrough and is designed to be concentrically received within the passageway 16 of the casing 11. The sleeve member 12 has an enlarged internally threaded port 24 at one end for attaching it to a rotating piping member (not shown), the port opening into the bore 23. The external surface of the sleeve 12 adjacent the end opposite the port 24 is provided with a shoulder 25 dividing the external surface into a first section 26 for seating a fluid seal 27 and a second section 28 for interfitting with the portion 21 of the casing 11. An annular groove 29 is provided in the second section 28 of the outer surface of the sleeve member 12 for receiving a ring collar 30, the purpose of which will be described hereinafter.

As shown in FIG. 2, the sleeve member 12 is received within the casing member 11 with the first section 26 of the sleeve 12 in the vicinity of the shoulder 25 closely adjacent the second portion 22 of the casing 11. The fluid seal 27 is disposed in a cavity defined by the shoulders 20 and 25 and the opposed surfaces of the casing and sleeve members, respectively.

As previously mentioned, the sleeve member 12 is rotatably supported in the casing member 11 by the spaced-apart thrust bearings 13 and 14. To this end, the ring collar 30 is split for mounting it in the groove 29 of the sleeve 12. The split collar 30 is encased within a cup-shaped retainer 31 for securing the collar 30 to the sleeve member 12 thus, preventing the sections of the collar 30 from moving radially outwardly therefrom and rubbing against the surface of the casing portion 19. As shown in FIG. 2, the thrust bearings 13 and 14 are mounted on the second section 28 of the sleeve 12 on opposite sides of the split collar 30, the bearing 13 being disposed between the opposite faces of the ring collar 30 and the first shoulder 18 of the casing 11, and the bearing 14 being disposed between the opposed faces of the collar 30 and the nut 15. The bearings 13 and 14, and thus the sleeve 12, are held in assembled relationship within the casing 11 by the nut 15 which is threadedly attached within and to the casing 11. It should be noted that the split collar 30 first allows mounting of the seals and bearings on the sleeve member 12 and then mounting the assemblage within the casing 11. This structural arrangement permits any type of end connections to be employed in the swivel joint. This structural arrangement also permits predetermined loads to be applied on the bearings 13 and 14 in the joint assembly 10.

As previously mentioned, the bearings 13 and 14 are preloaded by the nut 15 for firmly supporting the sleeve 12 in the casing 11. In order to maintain a set preload on the bearings 13 and 14 in the embodiments of the invention shown in FIGS. 2 and 4, a beveled retaining ring 32 is disposed in a beveled groove 33 provided in the first portion 19 of the casing 11. In this construction, the retaining ring 32 exerts a constant pressure on, and prevents loosening of, the nut 15 and thus loss of the preload on the bearings 13 and 14. As shown, the end face of the nut 15 is provided with radially extending slots 15' for accommodating a spanner wrench (not shown) for tightening the nut 15 and applying a predetermined preload on the bearings.

In order to keep the manufacturing costs of the casing 11 and the sleeve 12 at a minimum and yet provide a swivel joint 10 having an extended life, hardened wearing surfaces are provided between each of the bearings and their respective supporting surfaces. Accordingly, an annular race 34 is disposed between one face of the bearing 13 and the first shoulder 18 of the casing 11 while the opposite face of the bearing 13 bears against the radial portion 31' of the cup-shaped retainer 31 encasing the split collar 30. Also, the bearing 14 is mounted between and bears against opposed faces of like bearing races 35 and 36, the race 35 being disposed adjacent the collar 30 and the race 36 being disposed adjacent the end face of the nut 15.

Still referring particularly to FIG. 2, the swivel joint 10 includes a dust seal 37 which is disposed between the second section 28 of the sleeve 12 against the radial surface of a bore provided in a nut 15 for preventing dust and other debris from contaminating the bearings 13 and 14. The dust seal 37 also serves to retain lubricant around the bearings 13 and 14 which is introduced into the cavity containing the bearings 13 and 14 through a lubricating fitting 38 mounted in the casing 11.

Figure 3:
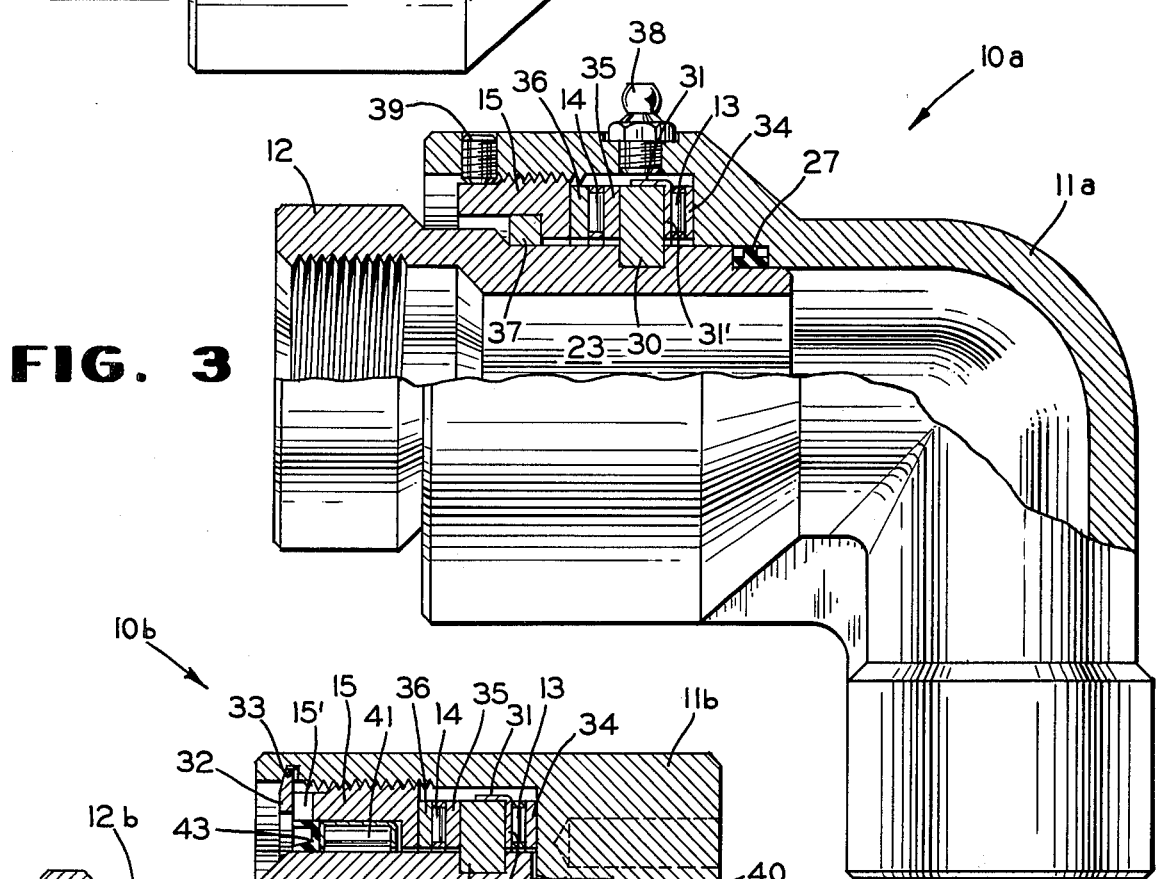
FIG. 3 is a view similar to FIG. 2, but illustrating a modified version of the swivel joint.

In the embodiment of the invention illustrated in FIG. 3, the swivel joint 10a is similar in all respects to the swivel joint 10 shown in FIG. 2, except for the casing 11a which is in the form of an elbow, and the nut 15 is locked in its preset position by a set screw 39.

Figure 4:
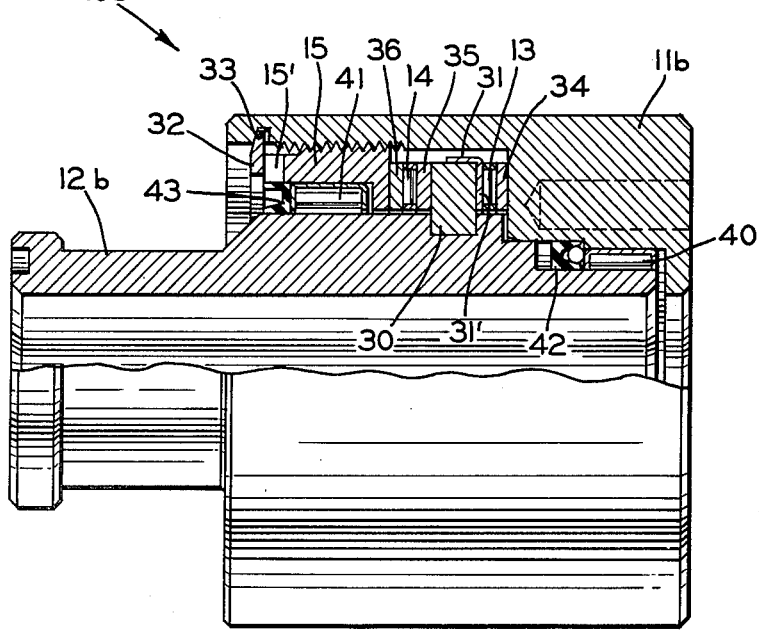
FIG. 4 is a longitudinal sectional view of another embodiment of the invention illustrating a swivel joint having side loading capabilities.

The embodiment of the invention shown in FIG. 4 illustrates a swivel joint 10b capable of withstanding extreme side or radial loads which may be present in some fluid systems. As illustrated in FIG. 4, the swivel joint 10b differs from the other embodiments in that the casing 11b and sleeve 12b are of modified form so that additionally, the joint 10b may be provided with first and second radial bearings 40 and 41, respectively, the radial bearings being mounted in the casing 11b for supporting the sleeve 12b for rotation relative thereto. The first radial bearing 40 is mounted at the marginal end of the sleeve 12b adjacent a fluid seal 42 and between the sleeve 12b and the casing 11b. The second radial bearing 41 surrounds the sleeve 12b and is mounted in the bottom of a counterbore provided in the nut 15 adjacent a dust seal 43.

It is to be understood that the forms of the invention herewith shown and described are to be taken as illustrative embodiments only of the same, and that various changes in the shape, size and arrangement of parts may be resorted to without departing from the spirit of the invention.

I claim:

1. In a swivel joint comprising:
   a. a casing member having an open end and a bore extending therethrough;
   b. a sleeve member concentrically arranged with the bore and rotatably mounted within said casing and extending through the open end thereof;
   c. a split annular collar mounted in a groove provided in the outer surface of said sleeve member;
   d. a cup-shaped retainer encasing said annular collar for restraining said collar from radial movement away from said sleeve member;
   e. a first thrust bearing surrounding the sleeve member and disposed between one side of said collar and said casing member;
   f. a second thrust bearing surrounding said sleeve member and abutting the opposite side of said annular collar; and
   g. means for applying a preload on said first and second thrust bearings.

2. A swivel joint as claimed in claim 1, including means for securing said preloading means in a predetermined relationship relative to said first and said second thrust bearings.

3. A swivel joint as claimed in claims 1 or 2, wherein said first and said second thrust bearings comprise needle bearings.

4. A swivel joint as claimed in claims 1 or 2, wherein said preloading means comprises a nut threadedly secured within the casing member which bears against said second thrust bearing.

5. A swivel joint as claimed in claim 2, wherein said securing means comprises a beveled retaining ring.

6. A swivel joint as claimed in claim 2, wherein said securing means comprises a set screw.

7. A swivel joint as claimed in claim 1, including a first radial bearing surrounding the marginal end of the sleeve member and supported within a bore provided in the casing member and a second radial bearing surrounding the sleeve member and supported within a bore provided in said preloading means.

* * * * *